(12) United States Patent
Håll et al.

(10) Patent No.: US 7,821,444 B2
(45) Date of Patent: Oct. 26, 2010

(54) RADAR LEVEL GAUGING SYSTEM WITH GALVANICALLY ISOLATING COMMUNICATION LINK

(75) Inventors: Ola Håll, Lerum (SE); Anders Welin, Torslanda (SE)

(73) Assignee: Rosemount Tank Radar AB, Gothenburg (SE)

( * ) Notice: Subject to any disclaimer, the term of this patent is extended or adjusted under 35 U.S.C. 154(b) by 373 days.

(21) Appl. No.: 12/106,596

(22) Filed: Apr. 21, 2008

(65) Prior Publication Data

US 2009/0322593 A1    Dec. 31, 2009

(51) Int. Cl.
G01F 23/284    (2006.01)
G01S 13/88    (2006.01)
G01S 13/08    (2006.01)

(52) U.S. Cl. ..................................... 342/124
(58) Field of Classification Search ................. 342/124, 342/89; 73/290 R; 324/600, 642, 644
See application file for complete search history.

(56) References Cited

U.S. PATENT DOCUMENTS

| | | | |
|---|---|---|---|
| 7,498,974 B2 * | 3/2009 | Nilsson | 342/124 |
| 7,701,385 B2 * | 4/2010 | Edvardsson | 342/124 |
| 2004/0036617 A1 | 2/2004 | Hall et al. | 340/612 |
| 2007/0118334 A1 * | 5/2007 | Guenter et al. | 702/187 |
| 2008/0074309 A1 | 3/2008 | Nilsson | 342/124 |
| 2009/0289835 A1 * | 11/2009 | Edvardsson | 342/124 |
| 2009/0322593 A1 * | 12/2009 | Hall et al. | 342/124 |

FOREIGN PATENT DOCUMENTS

| WO | WO 03/025523 | 3/2003 |
|---|---|---|
| WO | WO 2005/078475 | 8/2005 |
| WO | WO 2007/043951 | 4/2007 |
| WO | WO 2009131528 A1 * | 10/2009 |

OTHER PUBLICATIONS

International Search Report for PCT/SE2009/050408; filed Apr. 21, 2009; 4 pages.

* cited by examiner

*Primary Examiner*—Dan Pihulic
(74) *Attorney, Agent, or Firm*—Westman, Champlin & Kelly, P.A.

(57) ABSTRACT

A radar level gauging system for determining a level of a surface of a product in a tank, comprising a propagation device arranged to allow microwave signals to propagate towards the surface, and to return a reflection of the microwave signals from the surface and at least two radar level gauge (RLG) units. Each RLG unit includes transceiver circuitry, processing circuitry connected to the transceiver circuitry and adapted to determine the level based on a relation between transmitted and received signals, and a communication interface. The system further comprises a communication link interconnecting the RLG units, for communicating control data between the RLG units, the communication link comprising an isolating interface, ensuring galvanic isolation between the RLG units. One unit may communicate configuration data to the other RLG units which results in a simplified configuration of the sensor system and thus more cost effective compared to the prior art solutions.

13 Claims, 3 Drawing Sheets

RADAR LEVEL GAUGING SYSTEM WITH GALVANICALLY ISOLATING COMMUNICATION LINK

FIELD OF THE INVENTION

The present invention relates to a radar level gauging system for measuring process variables in a tank, and in particular the exchange of control data in such a system.

TECHNICAL BACKGROUND

Radar level gauging systems can be arranged in a tank, in order to provide information about process variables of a product in the tank. Examples of process variables that may be determined by such sensors are filling level, product composition, inflow, etc.

In such gauging systems, function independence is sometimes required. For example, safety regulations require that a high level alarm sensor and/or an overfill alarm sensor function independently of a level measurement sensor as well as of each other. Functional independence here means that a fault in one system does not render the other system(s) inoperative.

Such independence can be achieved by having several RLG units galvanically isolated from each other. This results in a system where each RLG unit is implemented with fully redundant hardware and software in order to meet both operational and service requirements. In case of level measurement and alarms, each RLG unit within the sensor system needs components for measuring the filling level, and each RLG unit needs an interface for receiving configuration data. Such RLG systems are used especially (but not exclusively) in marine applications, e.g. mounted on board tank ships.

In the case of advanced gauging systems, a large number of configuration parameters are required, and service commands are communicated to the sensor in order to determine its status. In systems with several independent sensors of this or similar type, the independency requirements make the system complex and expensive. In addition, operation of the system becomes time consuming and difficult, as large amounts of data must be communicated to each sensor.

GENERAL DISCLOSURE OF THE INVENTION

It is therefore an object of the present invention to provide an improved sensor system which overcomes, or at least mitigates, the above discussed problems of the prior art.

These and other objects are achieved by a radar level gauging system for determining a level of a surface of a product in a tank, comprising a propagation device arranged to allow microwave signals to propagate towards the surface, and to return a reflection of the microwave signals from the surface and at least two radar level gauge (RLG) units, each RLG unit including transceiver circuitry connected to the propagation device, the transceiver circuitry being adapted to transmit a microwave signal to the propagation device and to receive a reflected signal related to the reflection, processing circuitry connected to the transceiver circuitry and adapted to determine the level based on a relation between transmitted and received signals, and an interface for communicating measurement data acquired by the RLG unit externally of the RLG unit. The system further comprises a communication link interconnecting the RLG units, for communicating control data between the RLG units, the communication link comprising an isolating interface, ensuring galvanic isolation between the RLG units.

The isolating interface is adapted to ensure that charge-carrying particles cannot be transferred between sensors via the communication link, i.e. there is no conductive connection between the RLG units, and there is no electrical current flowing directly from one RLG unit to the next via the communication link. Energy and/or information can still be exchanged over the communication link by other means, however, such as by capacitance, induction, electromagnetic waves, optical, acoustic, or mechanical means.

One unit may hereby communicate configuration data to the rest of the RLG units which results in a simplified configuration of the sensor system and thus more cost effective compared to the prior art solutions.

According to one embodiment, the RLG units are functionally independent, such that, if a fault occurs in one of said RLG units, any other one of said RLG units remain operable. The isolating interface of the communication link ensures that the communication link can communicate of various control data between the RLG units without compromising the independent functionality of the different RLG units.

The control data may be configuration data, e.g. data related to the physical properties of the sensor installation or to user set parameters. Such configuration data that typically is the same for several sensors in the system, e.g. data related to the properties or geometry of the tank, may be communicated via the communication link from one sensor to the others.

If parts of the configuration data is manually entered, such data only needs to be input to one unit, resulting in increased usability, and a more efficient system. It also reduces the risk that configuration data differs between sensors.

The control data can also, or alternatively, be related to the measurement data acquired by the sensors. This enables each RLG unit to have information about the results from the other sensors, for example to verify that it is tracking the true measurement data. A further advantage is improved signal processing by comparing process data between the different functions.

Each RLG unit can be adapted to send and receive control data via said communication link, thus forming a completely bidirectional network of sensors. This is particularly advantageous when the control data is data that needs to be communicated from many sensors to many sensors, such as measurement data.

Alternatively, one of said RLG units may be a "master" unit, adapted to receive said control data from outside said sensor system, and remaining RLG units may be "slave" units, adapted to receive control data via the communication link from the master unit. Such a master unit can thus be used a point of entry for data that should reach all units, such as configuration data or external sensor data.

If a data input device is used for inputting control data, it is thus sufficient that the master unit comprises such an input device. The master unit can transmit the data to the other RLG units via the communication link. The slave units do thus not require any input devices.

The communication link may be based on optical signals, and e.g. comprise optical switches in each RLG unit, and optical links connecting these switches. Optical signals are known to provide a galvanically isolated communication link. The communication link may also be implemented e.g. using wireless network technology.

BRIEF DESCRIPTION OF THE DRAWINGS

This and other aspects of the present invention will now be described in more detail, with reference to the appended drawings showing a currently preferred embodiment of the invention.

DETAILED DESCRIPTION

Figure 1:
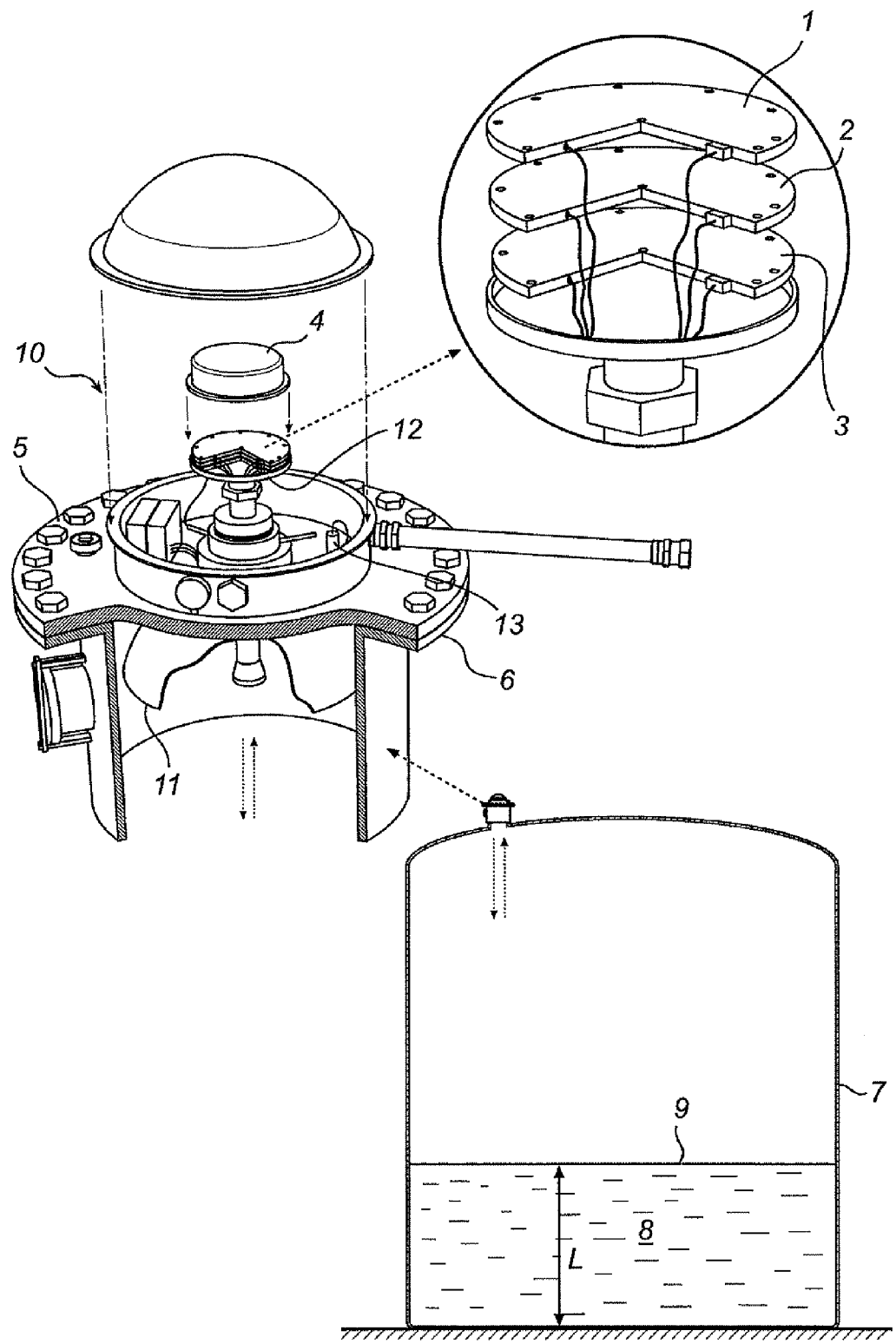
FIG. 1 is a perspective, and partly broken away view of a sensor system according to an embodiment of the invention.

The invention will be described with reference to a radar level gauging system 10 in FIG. 1, having three radar level gauge (RLG) units 1, 2, 3 physically integrated inside a protective housing 4. The housing 4 here comprises an outer cover 4a, as well as an inner cover 4b. At least the outer cover is adapted to protect the electronics in the gauging system from the outside environment, such as sea water spray if the system is mounted on a tank ship. At least one of the covers 4a, 4b may further be conductive, so as to shield the electronics from electromagnetic disturbance.

The system 10 has a flange 5 that is mounted on a corresponding flange 6 of an opening in the roof of a tank 7. The tank may be a stationary process tank as indicated in FIG. 1, but may also be a tank on a moving vessel, such as a tank ship. Each RLG unit is arranged to perform measurements of a process variable such as the filling level L or ullage level of a product 8 contained in the tank 7, by transmitting signals into the tank and receiving signals reflected by an interface 9 between two materials in the tank 7. Typically, the first material is a liquid product 8 stored in the tank, e.g. gasoline, while the second material is the atmosphere above the product, such as air.

All three RLG units are here connected to one common propagation device 11, for allowing signals from the transceivers to into the tank 7. For this purposes, the system comprises a combiner 12, arranged to combine signals from each RLG and provide a combined signal to the propagation device, and for separating a reflection received from the tank, so that a portion of this reflection resulting form a signal transmitted from a particular RLG is returned to this particular RLG. The combination/separation process may be based on polarization, frequency modulation, time modulation, etc. In case of polarization, the combiner can be a turnstile junction, as discussed in WO 2003/025523, herewith incorporated by reference.

The propagation device 11 is arranged to act as an adapter, transmitting electromagnetic waves into the tank 7 to be reflected by the interface 9. The propagation device can be a free propagating antenna or pipe, arranged in the top of the tank 7, as illustrated in FIG. 1. Alternatively, the propagation device 11 can be a guided wave transmission line. Such a transmission line can be a flexible wire suspended between top and bottom of the tank, or can be a rigid probe extending into the tank. It can be a single wire, twin wire, coaxial, or any other type of suitable transmission line. The propagation device may also be a hollow waveguide for guided propagation of electromagnetic waves.

The gauging system may be connected to one or several additional sensors 13. Examples of additional sensors comprise vapor pressure sensors and temperature sensors.

In the illustrated example, the first RLG unit 1 is used for level measurement, i.e. to provide a continuously updated value of the filling level or ullage in the tank. The second RLG unit 2 is used as an high level alarm, i.e. to provide an alarm signal when the filling level exceeds a predefined level, e.g. equal to 95% of the tank volume. The third RLG unit 3 is used as an overfill alarm, i.e. to provide an alarm signal when the filling level exceeds a predefined overfill level, e.g. 98% of the tank volume.

Various safety requirement, e.g. marine safety regulations, require that the sensors in FIG. 1 are functionally independent, i.e. that a fault in one sensor does not render the other systems inoperable. Note that this requirement can be fulfilled also when several RLGs are physically integrated and share the same propagation device, as illustrated in FIG. 1.

Figure 2:
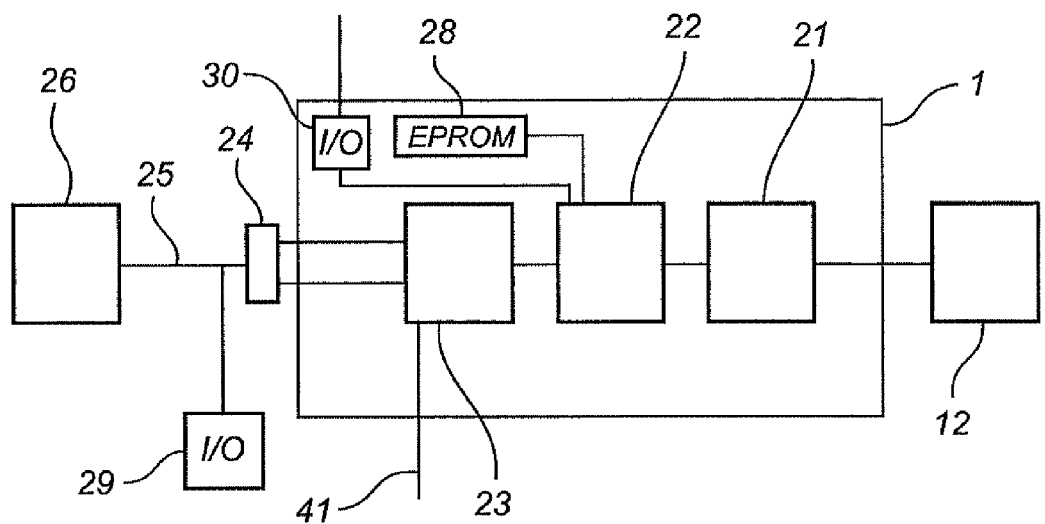
FIG. 2 is a more detailed view of an example of a radar level gauge unit suitable for the system in FIG. 1.

FIG. 2 shows a generalized schematic block diagram of an example of radar level gauge suitable for use in the system in FIG. 1.

The radar level gauge 1 includes transceiver circuitry 21, also referred to as a microwave module, connected to the propagation device 11. The radar level gauge 1 also includes timing circuitry and processing circuitry, here illustrated as a transceiver control and signal processing block 22, adapted to control the transceiver circuitry 21 and to determine a process variable of the product in the tank 7, based on a relation between waves transmitted and received by the transceiver 21.

The transceiver control and signal processing block 22 is further connected to a communication interface 23 which is adapted to provide communication externally of the radar level gauge 1 over a two wire interface 24. The two-wire interface 24 has a combined function of both communicating externally of the RLG unit 1, and for receiving power for operation of the RLG unit 1. In the two-wire interface 24 data can be communicated by a protocol superimposed on the current flowing through the interface. Examples of such protocols are HART, Profibus and Foundation Fieldbus. A serial bus 25 is connected to the interface 24, enabling communication between the RLG unit 1 data and a central control unit 26.

In addition to the power provided by the two-wire interface 24, additional power can be provided on separate wire pairs (not shown), e.g. connected to the microwave unit 21, processing circuitry 22 and/or communication interface 23.

The RLG unit 1 is typically placed in a hazardous zone, where intrinsic safety regulations have to be fulfilled. Preferably, all power supply is therefore made in an intrinsically safe manner, avoiding the need for explosion protective capsulation of the entire gauging system.

The RLG unit 1 can also comprise a non volatile memory, e.g. an EPROM 28, for storing various configuration data required for the signal processing. Such data may be communicated to the gauge 1 over bus 25 and interface 24. For this purpose, the bus 25 may also be connected to a user interface 29 for receiving manually entered configuration data. The user interface 29 may also be used for service applications, and be adapted to display information such as tank spectra, level related information, etc. The user interface 29 may be located in vicinity of the RLG unit 1 or remote, e.g. in a control room.

Figure 3:
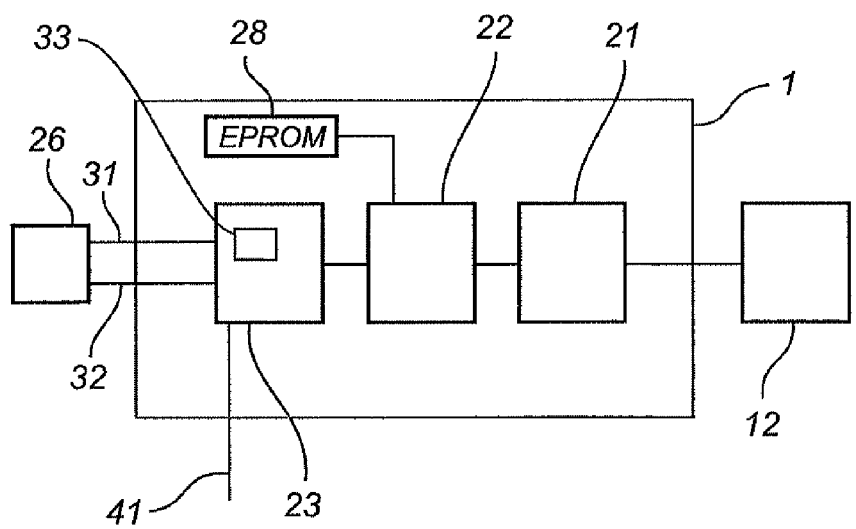
FIG. 3 is a more detailed view of a second example of a radar level gauge unit suitable for the system in FIG. 1.

Alternatively, as illustrated in FIG. 3, the communication between the communication interface 23 and the central control unit 26 is provided by an industrial loop (e.g. a 4-20 mA loop), where the measurement data is communicated by means of an analogue current value. In this case, a current control unit 33 is arranged in the communication interface to regulate the current in the lines 31, 32, in accordance with a measurement result determined by the data processing block 22.

A person skilled in the art realizes that other types of communication protocols might be used, such as for example a four-wire connection in which case the power supply to the radar level gauge 1 is supplied through two of the four wires, and the communication is provided through the remaining two wires.

In use, during each measurement cycle, the processing circuitry 22 controls the transceiver circuitry 21 to generate and transmit a measurement signal to be transmitted into the tank 7 by the propagation device 11. This signal can e.g. be a pulsed signal (pulsed level gauging) or a continuous signal with a frequency varying over a certain range (Frequency Modulated Continuous Wave, FMCW), or any other suitable signal modulation for tank gauging. In case of pulsed level gauging, the signals generated by the transceiver 21 can be DC pulses with a length of about 2 ns or less, with a pulse repetition frequency on the order of 1 MHz, and modulated on a carrier of a 4-11 GHz frequency (microwaves). In case of FMCW, the signals may lie in a frequency band having a bandwidth of e.g. 0.5-3 GHz, and a center frequency of e.g. around 6 GHz, 10 GHz or 26 GHz. Average output power levels can be in the mW to μW area. As mentioned above, the propagation device 11, here the antenna, acts as an adapter, enabling the signal generated in the transceiver 21 to propagate into the tank 7 as electromagnetic waves, which can be reflected by the surface 9 of the material 8.

A tank signal, i.e. the correlation of the transmitted signal and its echo, or a mix of transmitted and reflected signals, is received by the transceiver 21 via the propagation device 11, and communicated to the processing circuitry 22. The processing circuitry 22 determines a measurement result based on a relation between the emitted and received waves.

For satisfactory operation, each RLG unit is preferably provided with configuration data, for example defining the geometry of the tank, the characteristics of the product in the tank, etc. Such configuration data may be provided via bus 25 and interface 24, using the user interface 29. Alternatively, an input interface 30, separate from the interface 23, is connected to the circuitry 22, providing direct access to the RLG unit 1. The interface 30 may be used e.g. to connect a manual input device such as a keyboard directly to the RLG unit.

Figure 4:
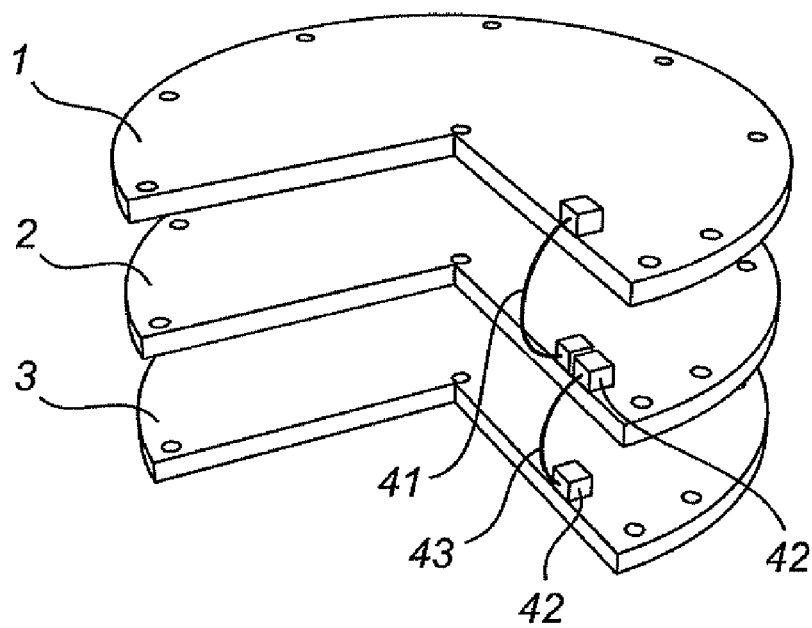
FIG. 4 is a schematic view of how a communication link according to an embodiment of the invention is implemented between three RLG units.

As illustrated in FIG. 4, the gauging system 10 further comprises a communication link 41 interconnecting the RLG units 1, 2, 3 while at the same time including a galvanically isolating interface, ensuring that electrical charge is not transferred between the units via the link. Such a galvanically isolating interface can be realized in different ways, and examples include an optical interface, an induction interface, or a short-range wireless interface, such as Bluetooth. Although referred to as "a" link, the link 41 may include several link segments, each segment connecting two of the RLG units 1, 2, 3 in the system 10.

Figure 5:
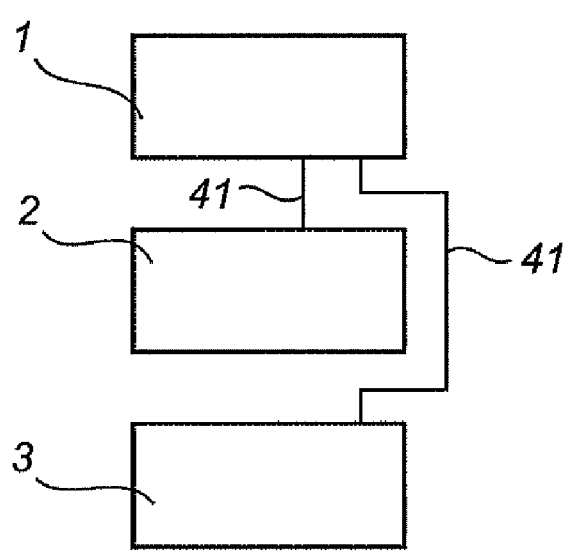
FIG. 5 shows an alternative way to connect the units in FIG. 4.

The link may be connected in series, as indicated in FIG. 4, but may alternatively be connected in parallel (see FIG. 5). In FIG. 2, the link 41 is indicated to be connected to the communication interface 23. If required, a separate communication driver may be provided for the communication link 41.

In FIG. 4, the communication link 41 is an optical link, where each segment connecting two units 1, 2, 3 comprises optical switches 42 in either end, and an optical guide, e.g. an optical cable 43 extending between the switches 42. By arranging the optical switches 42 facing each other on opposing surfaces of adjacent RLG units 1, 2, 3, the optical guide may be omitted.

The communication link 41 allows communication between the sensors 1, 2, 3, and possibly any external sensors 13, without compromising the functional independence. This may reduce the need for providing data separately to each sensor in the gauging system 10.

For example, as each RLG unit 1, 2, 3 is mounted in the same opening in the tank, the geometrical conditions will be identical for each unit. Therefore, tank related configuration data required by the processing unit, and stored in the EPROM 28 will be identical. Such configuration data may now be inputted only to one of the sensors, and then provided to the remaining sensors using the communication link 41.

As indicated in FIG. 1, it may now be sufficient to provide one user interface 29 for the entire sensor system 10. This significantly reduces cost and complexity, as the user interface typically is an expensive part of the system.

The RLG unit 1 that is arranged to receive data from outside the system can be regarded as a "master" unit, and the remaining RLG units, arranged to receive this data via the communication link 41, can be regarded as "slave" units. In the illustrated example of a radar level gauging system 10, the master sensor is preferably the RLG unit 1 used for continuous level measurement.

Another type of information that may be treated in a similar way is measurement data from the external sensor 13. Again, such data may be of use to all sensors, but is advantageously only received from the outside by one of the sensors and then communicated to the others using the communication link 41. According to one embodiment, the external sensor data is received by the master RLG unit and forwarded to the slave RLG units.

The communication link 41 may also be used to communicate measurement data from one sensor to another in the sensor system. For example, in the case of an radar level gauging system 10, it may be advantageous for one RLG unit to know what filling level is detected by the other RLG units. Such information may be used to detect an erroneous measurement value, or some malfunction.

The person skilled in the art realizes that while the present invention has been described above primarily with respect to a radar level gauging system, the invention is by no means limited to this application. On the contrary, the invention may advantageously be applied to any sensor system, where communication between a plurality of functionally independent sensors is desired.

What is claimed is:

1. A radar level gauging system for determining a level of a surface of a product in a tank, comprising:

a propagation device arranged to allow microwave signals to propagate towards said surface, and to return a reflection of said microwave signals from said surface;

at least two radar level gauge (RLG) units, each RLG unit including:

transceiver circuitry connected to said propagation device, said transceiver circuitry being adapted to transmit a microwave signal to said propagation device and to receive a reflected signal related to said reflection, processing circuitry connected to said transceiver circuitry and adapted to determine said level based on a relation between transmitted and received signals, and a communication interface for communicating measurement data acquired by said RLG unit externally of said RLG unit; and said system further comprising:

a communication link interconnecting said RLG units, for communicating control data between the RLG units, said communication link comprising an isolating interface, ensuring galvanic isolation between said RLG units.

2. The gauging system according to claim 1, further comprising a microwave combiner, connected to each transceiver circuitry and to said propagation device, said combiner being adapted to provide said propagation device with a combined signal formed by combining microwave signals transmitted from each transceiver circuitry, and to provide a specific transceiver circuitry with a reflected signal formed by separating a portion of said reflection relating to a microwave signal transmitted from said specific transceiver circuitry.

3. The gauging system according to claim 1, further comprising a protective housing, enclosing said RLG units and protecting them from surrounding atmosphere.

4. The gauging system according to claim 3, wherein said protective housing is conducting, so as to provide electromagnetic shielding of said RLG units.

5. The gauging system according to claim 1, wherein each RLG unit is adapted to send and receive control data via said communication link.

6. The gauging according to claim 1, wherein one of said RLG units is a master unit, adapted to receive said control data from externally of said gauging system, and remaining RLG units are slave units, adapted to receive control data via said communication link only from said master unit.

7. The gauging system according to claim 6, wherein the communication interface of said master unit is adapted to receive said control data.

8. The gauging system according to claim 6, wherein the master unit further comprises a data input interface, separate from said communication interface, for receiving control data.

9. The gauging system according to claim 1, wherein said communication link comprises optical switches in each RLG unit, and an optical guide interconnecting said optical switches.

10. The gauging system according to claim 1, wherein each RLG unit comprises a memory for storing configuration data at least partly relating to a geometry of said tank, and wherein the control data comprises said tank geometry related configuration data.

11. The gauging system according to claim 1, wherein the control data comprises measurement data related to said process variable.

12. The gauging system according to claim 1, wherein said RLG units are functionally independent, such that, if a fault occurs in one of said RLG units, any other one of said RLG units remain operable.

13. The gauging system according to claim 12, wherein at least one of said RLG units is an alarm unit, adapted to provide an alarm signal when a filling level of said tank exceeds a predefined level.

* * * * *